US009751792B2

(12) United States Patent
Madeni et al.

(10) Patent No.: US 9,751,792 B2
(45) Date of Patent: Sep. 5, 2017

(54) POST-MANUFACTURING PROCESSES FOR SUBMERGED COMBUSTION BURNER

(71) Applicant: JOHNS MANVILLE, Denver, CO (US)

(72) Inventors: Juan Carlos Madeni, Littleton, CO (US); John Wayne Baker, Golden, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/824,981

(22) Filed: Aug. 12, 2015

(65) Prior Publication Data

US 2017/0044040 A1 Feb. 16, 2017

(51) Int. Cl.
| | |
|---|---|
| C21D 9/50 | (2006.01) |
| C21D 9/00 | (2006.01) |
| C03B 5/235 | (2006.01) |
| C21D 1/74 | (2006.01) |
| C03B 5/44 | (2006.01) |

(52) U.S. Cl.
CPC .............. *C03B 5/2356* (2013.01); *C21D 1/74* (2013.01); *C21D 9/0068* (2013.01); *C21D 9/50* (2013.01); *C03B 5/44* (2013.01); *C03B 2211/22* (2013.01); *C03B 2211/60* (2013.01)

(58) Field of Classification Search
None
See application file for complete search history.

(56) References Cited

U.S. PATENT DOCUMENTS

| | | | |
|---|---|---|---|
| 1,579,353 A | 4/1926 | Good |
| 1,636,151 A | 7/1927 | Schofield |
| 1,679,295 A | 7/1928 | Dodge |
| 1,706,857 A | 3/1929 | Mathe |
| 1,716,433 A | 6/1929 | Ellis |
| 1,875,474 A | 9/1932 | McKinley |
| 1,883,023 A | 10/1932 | Slick |
| 1,937,321 A | 11/1933 | Howard |

(Continued)

FOREIGN PATENT DOCUMENTS

| | | |
|---|---|---|
| DE | 196 19 919 A1 | 8/1997 |
| DE | 100 29 983 C2 | 1/2002 |

(Continued)

OTHER PUBLICATIONS

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

(Continued)

*Primary Examiner* — Lisa Herring
(74) *Attorney, Agent, or Firm* — Robert D. Touslee

(57) ABSTRACT

A portion of a submerged combustion burner is disposed into a pressure vessel. The portion of the submerged combustion burner has a welded area that has a first microstructure defined by a first number of voids. The vessel is filled with an inert gas, pressurized, and heated. Pressurizing and heating operations are performed for a time and at a temperature and a pressure sufficient to produce a second microstructure in the welded area of the burner. The second microstructure is defined by a second number of voids less than the first number of voids.

12 Claims, 12 Drawing Sheets

(56) References Cited

U.S. PATENT DOCUMENTS

| | | |
|---|---|---|
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Womer |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,599,100 A | 7/1986 | Demarest |
| 4,612,162 A * | 9/1986 | Morgan ............... B22F 3/15 419/23 |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |

(56) References Cited

U.S. PATENT DOCUMENTS

| | | |
|---|---|---|
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,886 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Philippe |
| 5,979,191 A | 11/1999 | Jian |
| 5,984,667 A | 11/1999 | Philippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Philippe et al. |
| 6,071,116 A | 6/2000 | Philippe et al. |
| 6,074,197 A | 6/2000 | Philippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Philippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |

(56) References Cited

U.S. PATENT DOCUMENTS

| | | |
|---|---|---|
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Purnode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0101859 A1 | 5/2006 | Takagi et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0183850 A1* | 7/2009 | Morrison ............ B22F 5/009 164/91 |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |
| 2014/0163717 A1* | 6/2014 | Das ............ B22F 3/1055 700/119 |

FOREIGN PATENT DOCUMENTS

| | | |
|---|---|---|
| DE | 103 27 201 A1 | 1/2005 |
| DE | 10 2008 006 572 A1 | 7/2009 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 51 | 2/2011 |
| EP | 2 397 446 A2 | 12/2011 |
| EP | 2 433 911 A1 | 3/2012 |
| EP | 2 578 548 A2 | 4/2013 |
| GB | 191301772 | 0/1914 |
| GB | 191407633 | 0/1914 |
| GB | 164073 A | 5/1921 |
| GB | 1449439 | 9/1976 |
| JP | S61-99017 A | 5/1986 |
| RO | 114827 B | 7/1999 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |
| WO | WO 2014193390 A1 * | 12/2014 ............ C03B 5/2353 |

OTHER PUBLICATIONS

Rue et al, "Submerged Combustion Melting of Glass," International Journal of Applied Glass Science, Nov. 9, 2011, pp. 262-274, vol. 2, No. 4.

(56) References Cited

OTHER PUBLICATIONS

National Laboratory, US DOE contract No. DE-AC09-08SR22470, Oct. 2011.
"AccuTru Temperature Measurement," AccuTru International Corporation, 2003.
"Glass Technologies—The Legacy of a Successful Public-Private Partnership", 2007. U.S. Department of Energy, pp. 1-32.
"Glass Melting Technology—A Technical and Economic Assessment," 2004, U.S, Department of Energy, pp. 1-292.
Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in A Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Melter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problerns: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, copy received in Apr. 2012 at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass Industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes fear Improved Efficiency", DE-FG07-96EE41262, Final Report, Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3). pp. 551-555, 1991.
Kim et al., "Foaming in Glass Melts Produced by Sodium Sulfate Decomposition under Ramp Heating Conditions", Journal of the American Ceramic Society. 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.
Ross, C. Phillip, et al., "Glass Melting Technology: A Technical and Economic Assessment", Glass Manufacturing Industry Council with the U.S. Department of Energy—Office of Industrial Technologies Contract #DE-FC36-02D14315, pp. 1-292, Aug. 2004.

\* cited by examiner

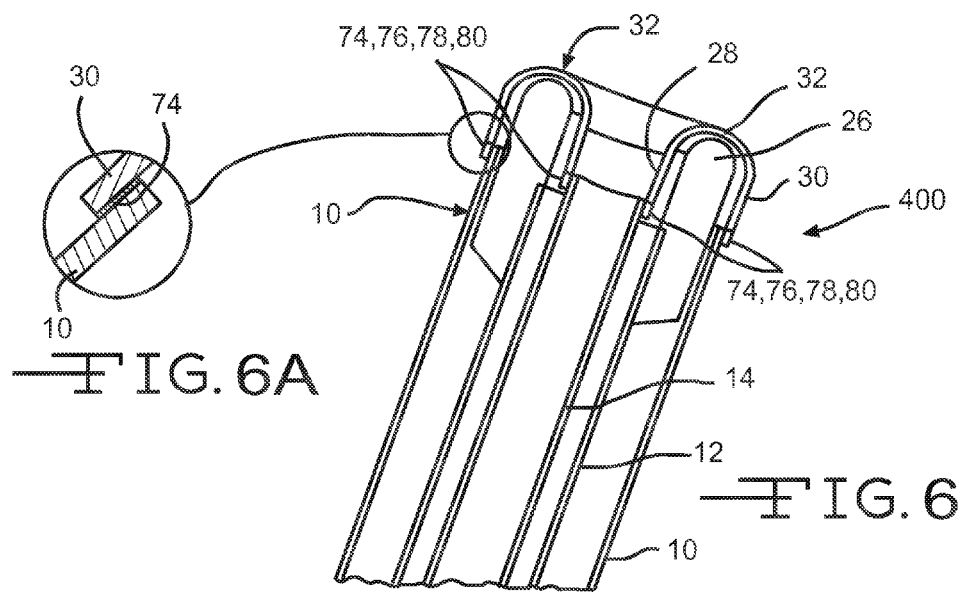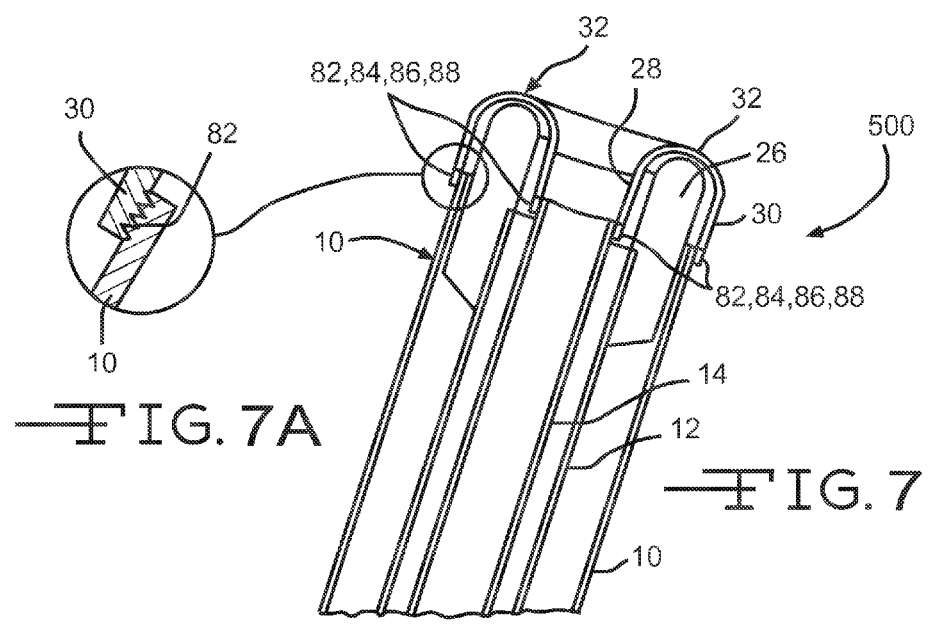

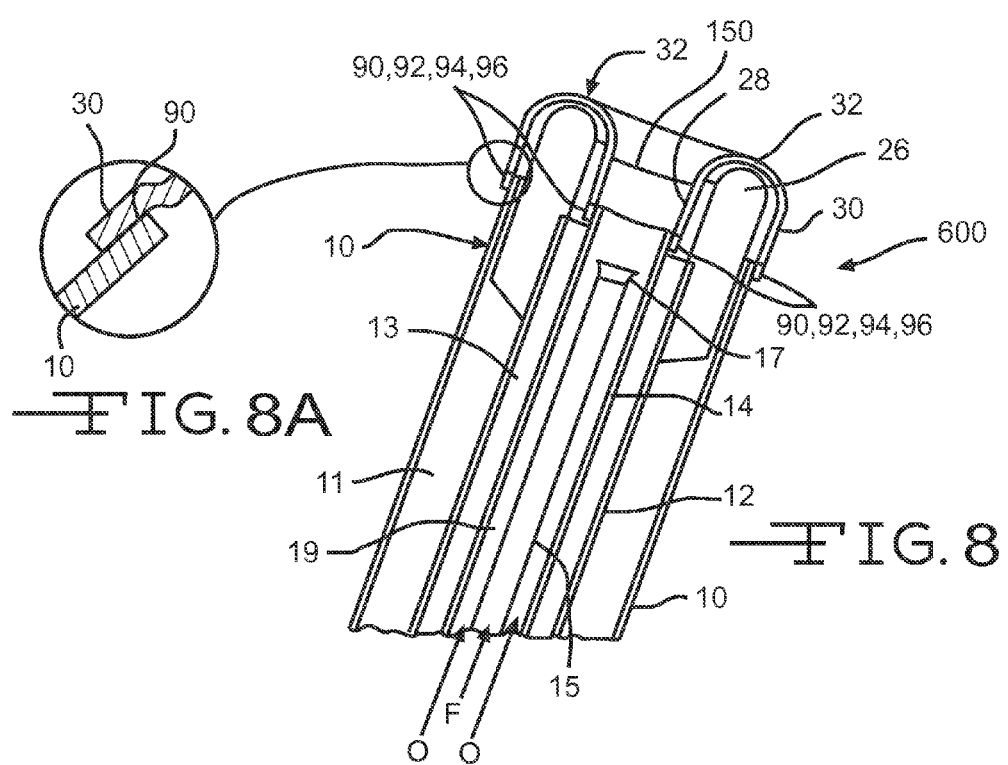

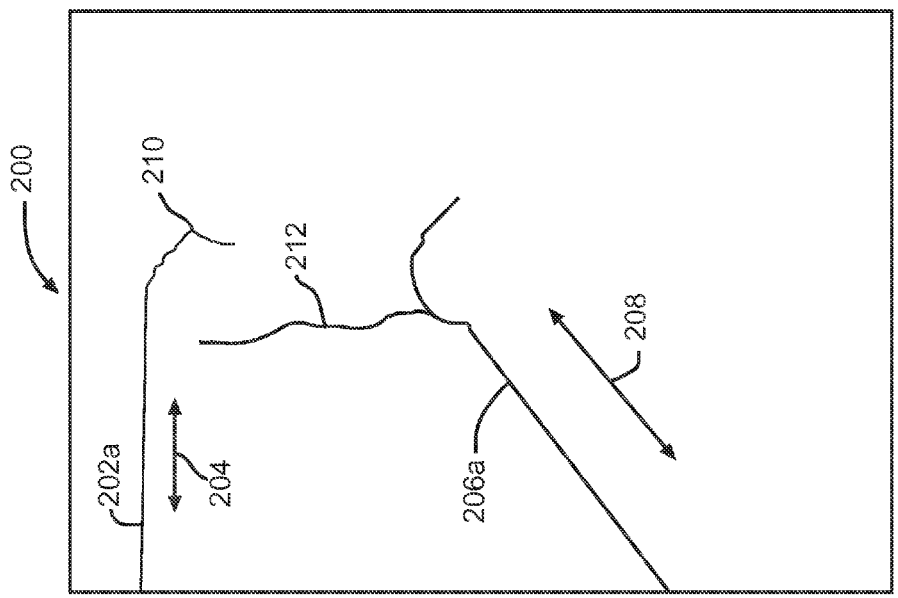
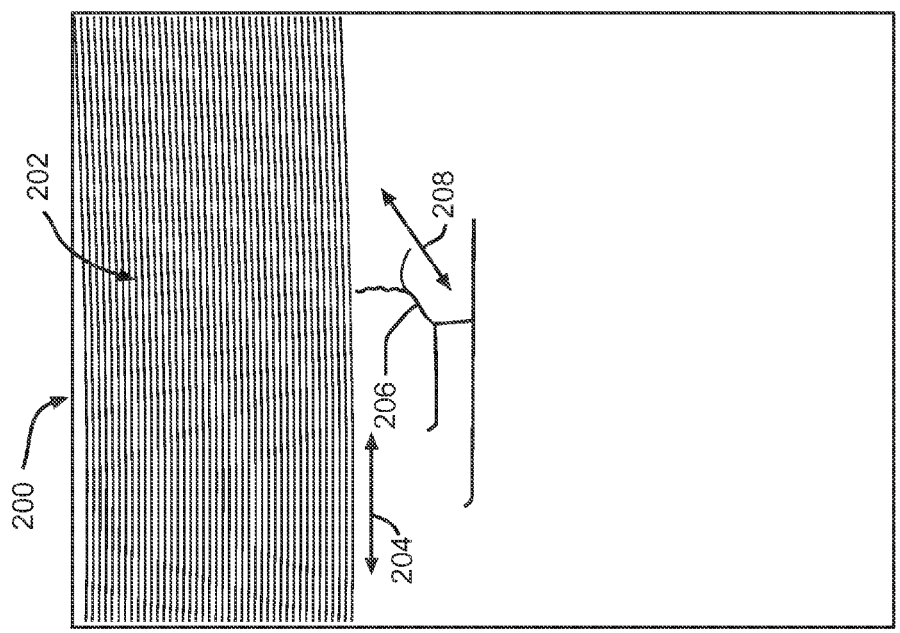

US 9,751,792 B2

POST-MANUFACTURING PROCESSES FOR SUBMERGED COMBUSTION BURNER

BACKGROUND

In submerged combustion melting (SCM), combustion gases are injected beneath a surface of a molten matrix and rise upward through the melt. The matrix may include glass and/or inorganic non-metallic feedstocks such as rock (basalt) and mineral wool (stone wool). Regardless of the material utilized, it is heated at a high efficiency via the intimate contact with the combustion gases and melts into a matrix. Using submerged combustion burners produces violent turbulence of the molten matrix and results in a high degree of mechanical energy in the submerged combustion melter. In this violent environment, the burners are subjected to significant thermal and mechanical stresses that may result in increased likelihood of early failure.

SUMMARY

In one aspect, the technology relates to a method including disposing at least a portion of a submerged combustion burner into a pressure vessel, wherein the portion of the submerged combustion burner has a first microstructure defined by a first number of voids; filling the vessel containing the portion of the submerged combustion burner with an inert gas; pressurizing the vessel containing the portion of the submerged combustion burner; and heating the vessel containing the portion of the submerged combustion burner, wherein the pressurizing and heating operations are performed for a time and at a temperature and a pressure sufficient to produce a second microstructure in the burner, wherein the second microstructure is defined by a second number of voids less than the first number of voids. In an embodiment, the portion includes at least one of a burner body, a burner tip, and a burner base. In another embodiment, the temperature is in a range from about 2200 degrees F. to about 3000 degrees F. In yet another embodiment, the temperature is in a range from about 2450 degrees F. to about 2750 degrees F. In still another embodiment, the temperature is about 2600 degrees F.

In another embodiment of the above aspect, the time is in a range from about 100 minutes to about 1000 minutes. In an embodiment, the time is in a range from about 200 minutes to about 600 minutes. In another embodiment, the time is about 365 minutes. In yet another embodiment, the pressure is in a range of between about 20,000 psi and about 50,000 psi. In still another embodiment, the pressure is in a range of between about 25,000 psi and about 40,000 psi.

In yet another embodiment of the above aspect, the pressure is about 30,000 psi. In an embodiment, the method further includes weld-repairing a defect in the portion of the submerged burner before disposing the portion of the submerged burner in the pressure vessel. In another embodiment, the method further includes: removing the portion of the submerged burner from the pressure vessel; non-destructively testing the portion of the submerged burner for a defect; weld-repairing the defect; and returning the portion of the submerged combustion burner to the pressure vessel.

In another aspect, the technology relates to a method including: disposing a toroidal tip of a submerged combustion burner in a vise, wherein the toroidal tip has an average first surface roughness across an area of the toroidal tip; and polishing the toroidal tip of the submerged combustion burner to an average second surface roughness across the area of the toroidal tip, wherein the average second surface roughness is less than the average first surface roughness. In an embodiment, the area of the toroidal tip includes a plurality of initial surface features having heights of about 10 microns to about 100 microns prior to polishing. In another embodiment, the area of the toroidal tip includes a plurality of polished features having heights not greater than 1 micron after polishing. In yet another embodiment, the area of the toroidal tip includes a plurality of polished features having heights between about 1 micron and about 0.1 micron after polishing. In still another embodiment the average second surface roughness is about 5% of the first surface roughness.

In another embodiment of the above aspect, the average second surface roughness is about 1% of the first surface roughness. In an embodiment, the average second surface roughness is about 0.1% of the first surface roughness. In another embodiment, the polishing operation is performed substantially circumferentially. In yet another embodiment, the polishing operation is performed randomly.

In another aspect, the technology relates to a system having: a melt vessel configured to receive a material and melt the material into a matrix, the melt vessel including: a base; a feed end wall defining a feed port for receiving the material; an exit end wall defining an exit port allowing egress of the matrix; and a roof, wherein the base, the feed end wall, the exit end wall, and the roof form a substantially closed volume; a transition channel in fluid communication with the exit port for receiving the matrix from the exit port; a plurality of burners disposed so as to penetrate the base, wherein at least one of the plurality of burners includes: a toroidal burner tip defining an outlet for delivering the combustion gases into the substantially closed volume; a portion exposed to the matrix, wherein the portion of the burner exposed to the matrix includes a plurality of polished features having heights not greater than 1 micron. In an embodiment, the portion exposed to the matrix includes the toroidal tip. In another embodiment, the portion exposed to the matrix includes a burner body. In yet another embodiment, the plurality of polished features has heights of less than about 0.5 micron.

In another aspect, the technology relates to a system having: a melt vessel configured to receive a material and melt the material into a matrix, the melt vessel including: a base; a feed end wall defining a feed port for receiving the material; an exit end wall defining an exit port allowing egress of the matrix; and a roof, wherein the base, the feed end wall, the exit end wall, and the roof form a substantially closed volume; a transition channel in fluid communication with the exit port for receiving the matrix from the exit port; a plurality of burners disposed so as to penetrate the base, wherein at least one of the plurality of burners includes a microstructure having a void fraction of less than about 1%.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

FIGS. 2-11 are schematic longitudinal cross-sectional views various examples of submerged combustion burners.

FIGS. 2A, 6A, 7A, 8A, and 11A are detailed cross-sectional views of various burner features described herein.

FIGS. 12A and 12B are a view and an enlarged view of a burner surface.

DETAILED DESCRIPTION

In the following description, numerous details are set forth to provide an understanding of various melter apparatus and process examples in accordance with the present disclosure. However, it will be understood by those skilled in the art that the melter apparatus and processes of using same may be practiced without these details and that numerous variations or modifications from the described examples may be possible which are nevertheless considered within the appended claims. All published patent applications and patents referenced herein are hereby incorporated by reference herein in their entireties.

Figure 1:
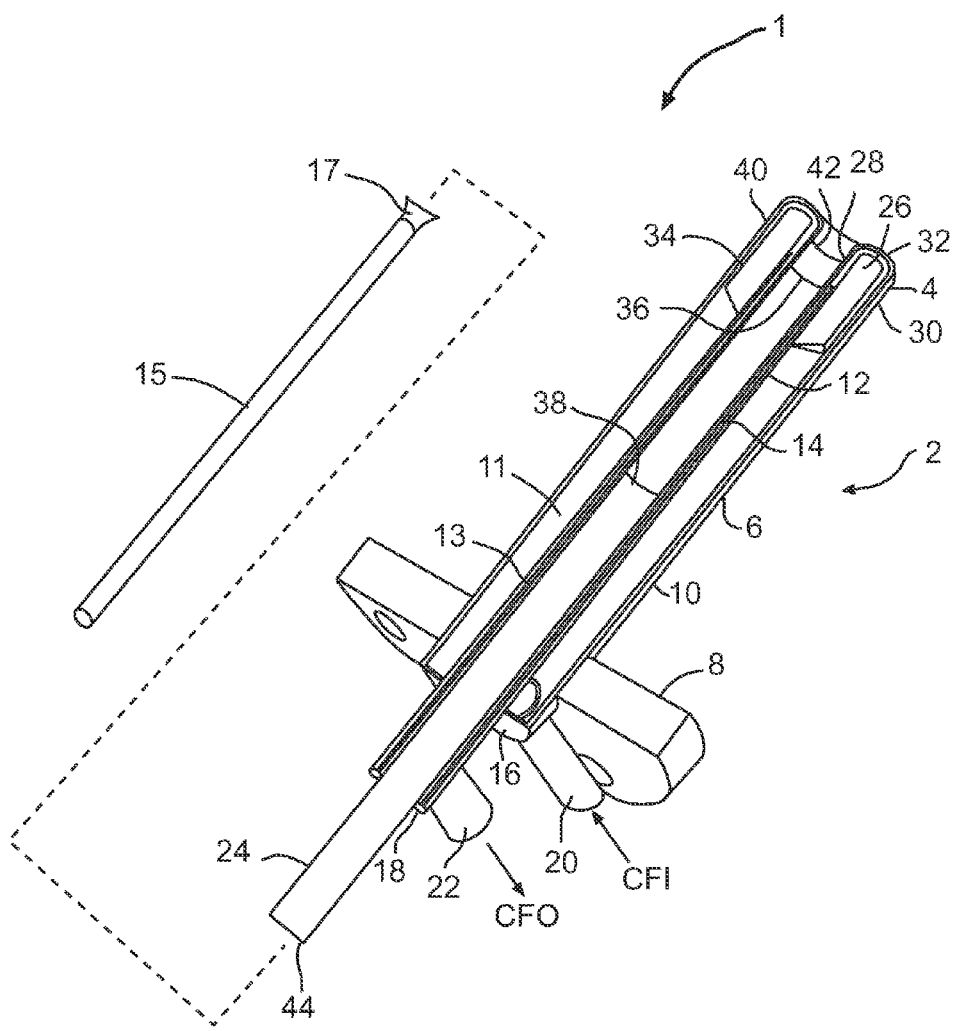
FIG. 1 is a longitudinal cross-section view of a burner.

The technologies described herein relate generally to burners used in a submerged combustion melter (SCM). In general, all burners require use of robust structure and materials so as to withstand mechanical and thermal stresses and fatigue while in the SCM environment. As such, material selection, manufacturing details, and post-manufacturing processing are all critical to help ensure a long service life of an SCM burner. The burners described herein, along with desirable materials, post-manufacturing processes, and so on, are uniquely suited to the SCM environment. SCM burners need not display all material, processing or functional properties described herein; however, it has been discovered that SCM burners having one or more of these characteristics can display significant advantages over burners not so constructed. Burners displaying many such characteristics display even greater advantages. Given the nature of the SCM process, very robust burners are desirable to avoid melter system downtime. FIG. 1 depicts a side sectional view of a burner 1 that may be utilized in conjunction with the examples of the technology described herein. The burner 1 is a submerged combustion melting (SCM) burner having a fluid-cooled portion 2 having a burner tip 4 attached to a burner body 6. A burner main flange 8 connects the burner to an SCM superstructure or melter system, illustrated below. Burner body 6 has an external conduit 10, a first internal conduit 12, a second internal conduit 14, and end plates 16, 18. A coolant fluid inlet conduit 20 is provided, along with a coolant fluid exit conduit 22, allowing ingress of a cool coolant fluid as indicated by an arrow CFI, and warmed coolant fluid egress, as indicated by an arrow CFO, respectively. A first annulus 11 is thus formed between substantially concentric external conduit 10 and first internal conduit 12, and a second annulus 13 is formed between substantially concentric first and second internal conduits 12, 14. A proximal end 24 of second internal conduit 14 may be sized to allow insertion of a fuel or oxidant conduit 15 (depending on the burner arrangement), which may or may not include a distal end nozzle 17. When conduit 15 and optional nozzle 17 are inserted internal of second internal conduit 14, a third annulus is formed there between. In certain examples, oxidant flows through the third annulus, while one or more fuels flow through conduit 15, entering through a port 44. In certain other examples, one or more fuels flow through the third annulus, while oxidant flows through conduit 15, entering through port 44.

Burners described herein may be air-fuel burners that combust one or more fuels with only air, or oxy-fuel burners that combust one or more fuels with either oxygen alone, or employ oxygen-enriched air, or some other combination of air and oxygen, including combustion burners where the primary oxidant is air, and secondary and tertiary oxidants are oxygen. Burners may be comprised of metal, ceramic, ceramic-lined metal, or combination thereof. Air in an air-fuel mixture may include ambient air as well as gases having the same molar concentration of oxygen as air. Oxygen-enriched air having an oxygen concentration greater than 121 mole percent may be used. Oxygen may include pure oxygen, such as industrial grade oxygen, food grade oxygen, and cryogenic oxygen. Oxygen-enriched air may have 50 mole percent or more oxygen, and in certain examples may be 90 mole percent or more oxygen. Oxidants such as air, oxygen-enriched air, and pure oxygen may be supplied from a pipeline, cylinders, storage facility, cryogenic air separation unit, membrane permeation separator, or adsorption unit.

The fuel burned by the burners may be a combustible composition (either in gaseous, liquid, or solid form, or any flowable combination of these) having a major portion of, for example, methane, natural gas, liquefied natural gas, propane, atomized oil, powders or the like. Contemplated fuels may include minor amounts of non-fuels therein, including oxidants, for purposes such as premixing the fuel with the oxidant, or atomizing liquid fuels.

The fluid-cooled portion 2 of the burner 1 includes a ceramic or other material insert 26 fitted to the distal end of first internal conduit 12. Insert 26 has a shape similar to but smaller than burner tip 4, allowing coolant fluid to pass between burner tip 4 and insert 26, thus cooling burner tip 4. Various types of coolants are described below. Burner tip 4 includes an inner wall 28, an outer wall 30, and a crown 32 connecting inner wall 28 and outer wall 30. In examples, welds at locations 34 and 36, and optionally at 38, 40 and 42, connect burner tip 4 to external conduit 10 and second internal conduit 14, using conventional weld materials to weld together similar base metal parts, such as carbon steel, stainless steel, or titanium.

Selection of burner tip material and type of connections between the burner tip walls and conduits forming the burner body may significantly increase the operating life of submerged combustion burners used to melt materials in an SCM. More particularly, at least one of the corrosion and/or fatigue resistance of the outer wall of the burner tip is greater than material comprising the external conduit under conditions experienced during submerged combustion melting of materials. Additionally, the surfaces of the burner (including the burner tip or burner body) may be further processed after manufacture so as to increase performance and reduce materials imperfections so as to improve resistance of these components to fatigue.

Burner tips may be manufactured of noble metals or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. In certain examples the burner tip may be a platinum/rhodium alloy attached to the base metals comprising the burner body using a variety of techniques, such as brazing, flanged fittings, interference fittings, friction welding, threaded fittings, and the like, as further described herein with regard to specific examples. Threaded connections may eliminate the need for third party forgings and expensive welding or brazing processes— considerably improving system delivery time and overall cost. It will be understood, however, that the use of third party forgings, welding, and brazing are not ruled out for burners described herein, and may actually be preferable in certain situations. Such connections are described in the examples below.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45; 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

Certain noble metal alloy examples include three or more noble metals, the percentages of each individual noble metal may range from equal amounts of all noble metals in the composition (about 33.33 percent of each), to compositions comprising, or consisting essentially of, 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of glass matrix to be produced. The skilled artisan, having knowledge of the particular application, pressures, temperatures, and available materials, will be able design the most cost effective, safe, and operable burners for each particular application without undue experimentation.

Various metals and metal alloys may display both corrosion resistance and fatigue resistant resistance. These two terms are used herein refer to two different failure mechanisms (corrosion and fatigue) that may occur simultaneously, and it is theorized that these failure mechanisms may actually influence each other in profound ways. As such, the present application utilizes a term that may be used to describe these dual influences, denoted "cortigue" or "cortigue resistance." These terms refer to a burner tip material that will have a satisfactory service life of at least 12 months under conditions existing in a continuously operating SCM adjacent to the burner tip. As used herein the SCM may comprise a floor, a roof, and a sidewall structure connecting the floor and roof defining an internal space, at least a portion of the internal space comprising a melting zone, and one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone. An example of an SCM system is depicted below in FIG. 16.

Certain examples may comprise a burner tip insert shaped substantially the same as but smaller than the burner tip and positioned in an internal space defined by the burner tip, the insert configured so that a cooling fluid may pass between internal surfaces of the burner tip and an external surface of the insert. In these examples a first or distal end of the first internal conduit would be attached to the insert. In certain examples, the inner and outer walls of the burner tip body may extend beyond the first end of the first internal conduit, at least partially defining a mixing region for oxidant and fuel.

Conduits of burner bodies and associated components (such as spacers and supports between conduits, but not burner tips) used in SC burners, SCMs and processes of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are qualified under standards set by NACE International of Houston, Tex., may be employed for burner body components. Use of high strength steel and other high strength materials may significantly reduce the conduit wall thickness required, reducing weight of the burners.

The melter geometry and operating temperature, burner and burner tip geometry, and type of glass to be produced, may dictate the choice of a particular material, among other parameters.

In certain SCMs, one or more burners in the SCM and/or flow channel(s) downstream thereof may be adjustable with respect to direction of flow of the combustion products. Adjustment may be via automatic, semi-automatic, or manual control. Certain system examples may comprise a burner mount that mounts the burner in the wall structure, roof, or floor of the SCM and/or flow channel comprising a refractory, or refractory-lined ball joint. Other burner mounts may comprise rails mounted in slots in the wall or roof. In yet other examples the burners may be mounted outside of the melter or channel, on supports that allow adjustment of the combustion products flow direction. Useable supports include those comprising ball joints, cradles, rails, and the like.

Certain SCMs and process examples of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain SCMs and processes of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, composition of bubbles and/or foam, and combinations thereof, and may employ a control algorithm to control combustion temperature, treatment composition flow rate or composition, based on one or more of these input parameters.

In the burners described in the below examples, the burner tip may be joined to burner body using flanges. When joined in this way, some design considerations include the thickness of the flange, the width of the flange, and the shape of the area surrounding the junction as this location is typically cooled with a coolant fluid and pressure drop needs to be minimized. In addition, when using flanges, gasket material is selected to ensure sealing and the ability to expose the flange to an oxygen or oxygen-enriched environment. In addition, or in certain alternative examples, plastically deformable features may be positioned on one or more of the flange faces to enable joint sealing.

In other examples, brazing compounds and methods may be used to attach burner tip to burner body. Brazing allows the joining of dissimilar metals and also allows for repairs to be made by removing the braze material. For these examples to be successful, the mating surfaces must be parallel or substantially so, and of sufficient overlap to ensure that the brazing material may properly flow between the portions of the burner tip and burner body being joined. This may be achieved in certain examples using a flange at right angles to both the burner tip walls 28, 30 (depicted in FIG. 1 and described in more detail below), and the conduits forming burner body. In other examples brazing may be successfully achieved by making the burner tip walls 28, 30 and conduits 14, 10 overlap with sufficient gaps to allow brazing material to enter the gaps.

Braze compounds, sometimes referred to as braze alloys, to be useful in certain examples, must have liquidus and solidus temperatures above the highest temperature of the burner tip. The highest temperature of the burner tip will be a temperature equal to the melt temperature existing in the SCM reduced by the flow of coolant through the burner tip, as well as by the flow of combustion gases through the burner tip. The highest temperature of the burner tip during normal operating conditions depends on the type of matrix being melted, which makes the selection of braze alloy not a simple matter. For Na—Ca—Si soda-lime window glass (Glass 1), typical melt temperature may range from about 1275° C. to about 1330° C.; for Al—Ca—Si E glass having low sodium and zero boron (Glass 2), the melt temperature may range from about 1395° C. to about 1450° C.; for B—Al—Si glass, zero sodium, zero potassium, high Si (Glass 3), the melt temperature may be about 1625° C.; and for B—Al—Ca—Si E glass used for reinforcement fiber (Glass 4), the melt temperature may be about 1385° C. This information was taken from Rue, D., "Energy Efficient Glass Melting—The Next Generation Melter", p. 63, GTI Project Number 20621, March, 2008 (U.S. Dept. of Energy). Based on these temperatures, and assuming a drop in burner tip temperature of 300° C. due to coolant and gas flow through the burner tip, Table 1 lists the possible braze alloys that may be used.

TABLE 1

Braze Alloys

| Glass Type | Glass Melt T, (° C.) | Possible Braze Alloys | Solidus T, (° C.) |
|---|---|---|---|
| 1 | 1275-1330 | Pt | 1769 |
| | | Pd | 1555 |
| | | Ti | 1670 |
| | | Au/Pd (92/8, PALORO (BAU-8)) | 1200 |
| | | Ni/Pd (40/60, PALNI) | 1238 |
| | | Pd/Co (65/35, PALCO BPD-1) | 1219 |
| | | Pd/Ni/Au (34/36/30, PALNIRO 4 (AMS-4785)) | 1135 |
| | | Cu | 1083 |
| | | Au | 1064 |
| 2 | 1395-1450 | Pt | 1769 |
| | | Pd | 1555 |
| | | Ti | 1670 |
| | | Au/Pd (92/8, PALORO (BAU-8)) | 1200 |
| | | Ni/Pd (40/60, PALNI) | 1238 |
| | | Pd/Co (65/35, PALCO BPD-1) | 1219 |
| 3 | 1625 | Pt | 1769 |
| | | Ti | 1670 |
| 4 | 1385 | Pt | 1769 |
| | | Pd | 1555 |
| | | Ti | 1670 |
| | | Au/Pd (92/8, PALORO (BAU-8)) | 1200 |
| | | Ni/Pd (40/60, PALNI) | 1238 |
| | | Pd/Co (65/35, PALCO BPD-1) | 1219 |
| | | Pd/Ni/Au (34/36/30 PALNIRO 4 (AMS-4785)) | 1135 |

In yet other examples, burner tip walls and conduit 14, 10 may be threaded together, in certain examples accompanied by a sealant surface of flange upon which sealants, gaskets or O-rings may be present. Threaded joints may be straight or tapered such as NPT. In certain threaded examples the sealing surfaces of burner tip walls 28, 30 may be malleable enough compared to conduits 14, 10 to deform and form their own seals, without sealants, gaskets, or O-rings.

In still other examples, burner tip walls 28, 30 may be interference or press fit to their respective conduit 14, 10 of burner body 6. In these examples, the walls and/or conduits are machined to sufficiently close tolerances to enable deformation of one or both surfaces as the two parts are forcefully joined together.

In yet other examples, burner tip walls 28, 30 may be friction welded together. In these examples, either the burner tip walls or burner body conduits, or both, may be spun and forced into contact until sufficient temperature is generated by friction to melt a portion of either or both materials, welding walls 28, 30 to conduits 14, 10, respectively. These examples may include one or more additional metals serving as an intermediate between walls 28, 30 and conduits 14, 10 to facilitate friction welding.

Specific non-limiting burner, burner tip, SCM and process examples in accordance with the present disclosure will now be presented in conjunction with FIGS. 1-11. The same or similar numerals are used for the same or similar features in the various figures. In the views illustrated in FIGS. 1-8, it will be understood in each case that the figures are schematic in nature, and certain conventional features are not illustrated in order to illustrate more clearly the key features of each example.

Figures 2, 2A:
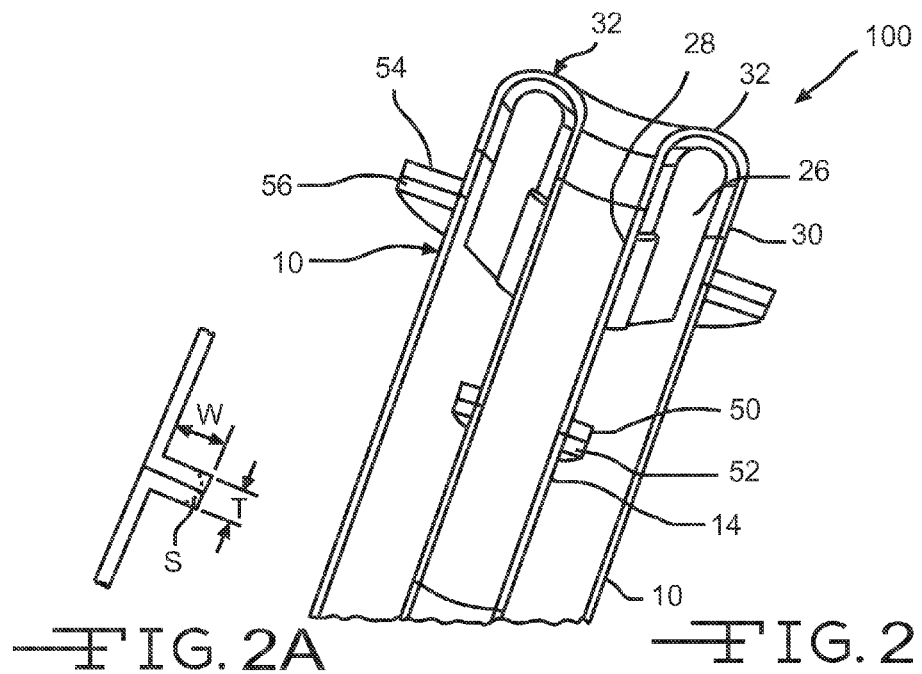
Figure 3:
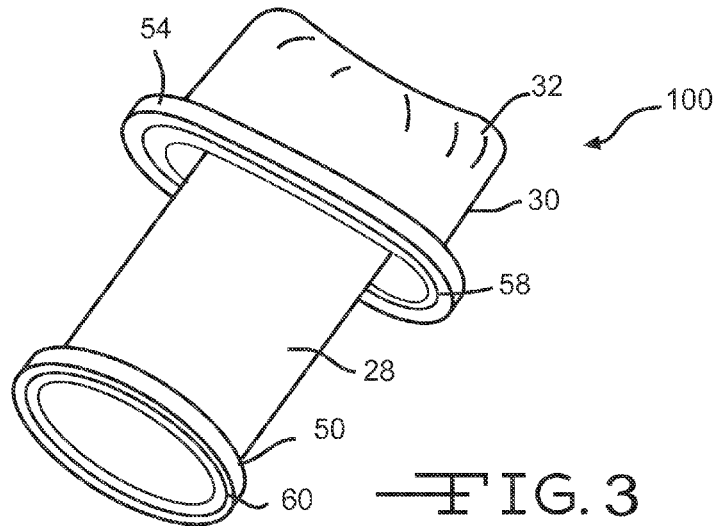
Figure 4:
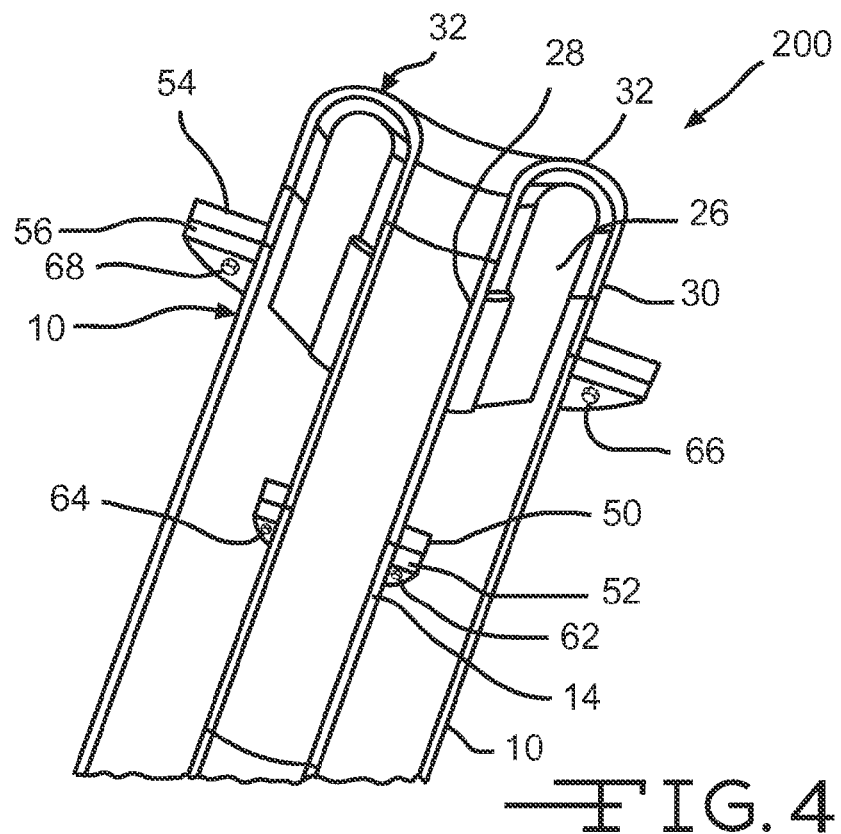

Referring now again to the figures, FIGS. 2-11 are schematic longitudinal cross-sectional views of non-limiting examples of fluid-cooled portions of various examples of SC burners in accordance with the present disclosure, while FIGS. 2A, 6A, 7A, 8A, and 11A are detailed cross-sectional views of various burner features described herein. Embodiment 100 illustrated schematically in FIG. 2 includes a Pt/Rh or other corrosion and fatigue resistant inner flange portion 50 mated with a base metal inner flange portion 52. Flange portions 50, 52 serve to connect inner wall 28 of the burner tip to second internal conduit 14. Also illustrated are Pt/Rh or other corrosion and fatigue resistant outer flange portion 54 mated with a base metal outer flange portion 56. Flange portions 54, 56 serve to connect outer wall 30 of the burner tip to external conduit 10. Bolting is not illustrated for clarity, but it is understood that flange portions 50, 52 are bolted together, as are flange portions 54, 56. Bolting may be of the threaded-bolt-and-nut type, or simply a threaded bolt that passes completely through one flange portion and partially or completely through the mating flange portion. Bolting of the latter type is illustrated schematically in embodiment 200 of FIG. 4, illustrating bolts 62, 64, 66, and 68.

The dimensions of thickness "T" and width "W" of the flange connection formed by flange portions 50, 52 are illustrated schematically in FIG. 2A, as well as a shape feature, "S", in dashed lines, indicating that flange portion 50, 52 may have some other shape to minimize pressure drop of coolant fluid through the first and second annuli, discussed herein. Note that "W" must be a value that allows a gap between the flange formed by flange portions 50, 52 and the first internal conduit 12 depicted in FIG. 1 (not shown in FIG. 2) to allow warmed coolant fluid to flow out of the fluid-cooled portion of the burner. Depending on the inner diameter of first internal conduit 12 in the location of flange portions 50, 52, "W" may range from 1 or more centimeters, in certain examples up to 30 centimeters or more. "T" may range from about 1 to about 10 centimeters, or from about 1 to about 5 centimeters. "S" may be rounded, ovoid, or angled, chamfered, beveled, and the like.

FIG. 3 is a perspective view of the burner tip of embodiment 100, illustrating schematically the inclusion of deformable features 58, 60 on the faces of flange portions 50, 54. In the embodiment illustrated in FIG. 3, deformable features 58, 60 are raised linear areas of Pt/Rh or other corrosion/fatigue resistant material, but the format of the deformable areas may be any format that will deform the areas to form a seal, such as a plurality of discrete circular areas ("dots"), or dashed areas. Another embodiment, not illustrated, is to provide machined or molded non-deformable areas or regions on the mating faces of base metal flange portions 52, 56 (FIG. 2) and allow these non-deformable features to deform mating regions of corrosion/fatigue resistant flange portions 50, 54, it being understood that the hardness and/or ductility of the base metal are generally greater than the hardness and/or ductility of the corrosion/fatigue resistant material of the burner tip.

Careful selection of gasket material is a feature of embodiment 200 illustrated in FIG. 4, which does not employ deformable features in the flange faces. In these examples, the gasket material used is resistant to oxygen attack, the required resistance level being greater as the percentage of oxygen in the oxidant stream increases. Suitable metallic gasket materials depend on the temperature, oxygen concentration, and expected life, but may include INCONEL (an alloy comprising 77 percent Ni, 15 percent Cr and 7 percent Fe) and titanium. Silica fabrics and silica tapes, such as those known under the trade designation MAXSIL (McAllister Mills, Inc., Independence, Va.), may be used.

Figure 5:
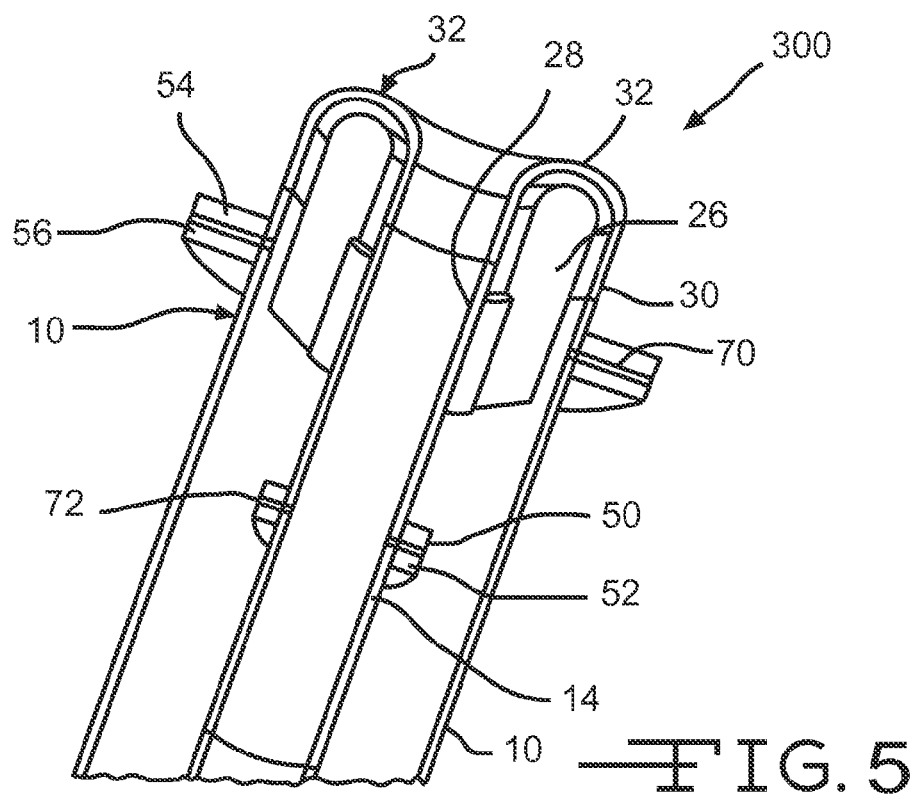

FIG. 5 illustrates schematically embodiment 300 employing the same or different braze materials 70 and 72 between flange portions 54, 56 and 50, 52, respectively. The braze materials may be independently selected from any metallic braze materials having a solidus temperature at least 10° C., preferably at least 20° C. greater than the burner tip temperature, cooled by flowing coolant and flowing combustion gases, oxidant and/or fuel. Some non-limiting examples are provided in Table 1 herein. In certain examples it may not be necessary that the braze material fill the entire width "W" of the flange joint or joints, however, those examples having 100 percent fill are exemplary examples.

FIG. 6 illustrates schematically embodiment 400, an alternative wherein the same or different braze materials 74, 76, 78, and 80 are used in joints that are substantially parallel to the conduits of the burner and walls of the burner tip. Braze materials 74, 76, 78, and 80 may be independently selected from any metallic braze materials having a solidus temperature at least 10° C., preferably at least 20° C. greater than the burner tip temperature, cooled by flowing coolant and flowing combustion gases, oxidant and/or fuel. Some non-limiting examples are provided in Table 1 herein. In certain examples it may not be necessary that the braze material fill the entire overlapping area of the joined parts, however, those examples having 100 percent fill of the overlapping areas are exemplary examples. A more detailed view of the braze area 74 is illustrated schematically in FIG. 6A. In these examples, the corrosion/fatigue resistant material of burner tip walls 28, 30 do not deform substantially, although they may deform slightly.

FIG. 7 illustrates schematically embodiment 500, an alternative wherein the same or different threaded joints 82, 84, 86, and 88 may be present. FIG. 7A illustrates a detailed view of threaded joint 82, a straight thread. Tapered threads may also be employed. As mentioned herein, threaded joint may utilize sealants, gaskets, O-rings, and the like, or may simply utilize deformable threads. Certain threaded examples may use a combination of two or more of these sealing techniques.

FIG. 8 illustrates yet another embodiment 600, embodiment 600 featuring interference fittings 90, 92, 94, and 96 between inner and outer walls 28, 30 of the corrosion/fatigue resistant burner tip, and conduits 10 and 14 of the base material burner body. FIG. 8A is a detailed schematic illustration of interference fit joint 90, illustrating in a slightly exaggerated manner the deformation of out wall 30.

Figure 9:
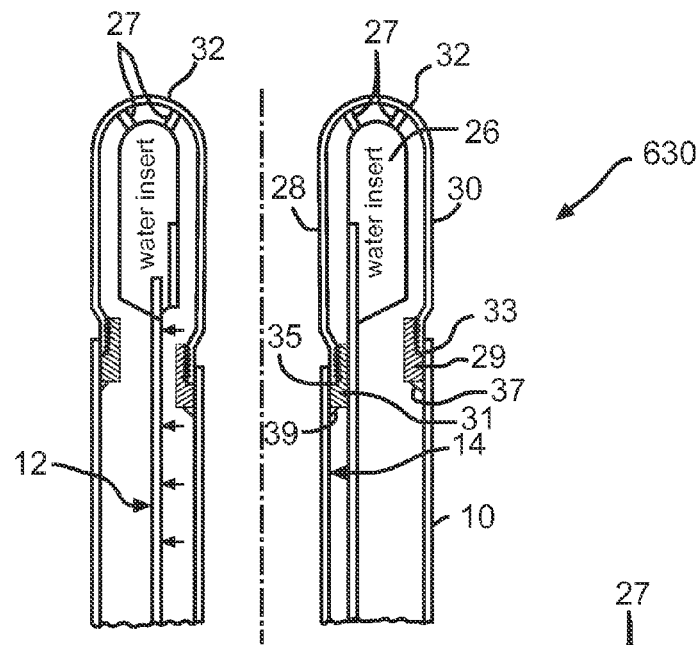

FIG. 9 illustrates schematically yet another embodiment 630, featuring inner and outer threaded rings 29, 31, O-rings 33, 35, and weld, solder, or braze areas 37, 39. Arrows on the left portion of FIG. 9 illustrated schematically repositioning of conduit 12 so that insert 26 will fit between threaded rings 29, 31 upon assembly and disassembly. Two positioning pins 27 are illustrated (more or less than two may be used), which function to maintain a gap between insert 26 and crown 32 for coolant flow. In embodiment 630, burner tip inner and outer walls 28, 30, and crown 32 may be a single noble metal piece, or may be separate pieces welded, soldered, or brazed together. Issues of possible crossthreading of noble metal threads of inner and outer walls 28, 30 of the burner tip to noble metal or non-noble metal threads of rings 29, 31 may disfavor this design, as well as the need to reposition conduit 12. In one variation, threads may instead be press-fit locking dog connections.

Figure 10:
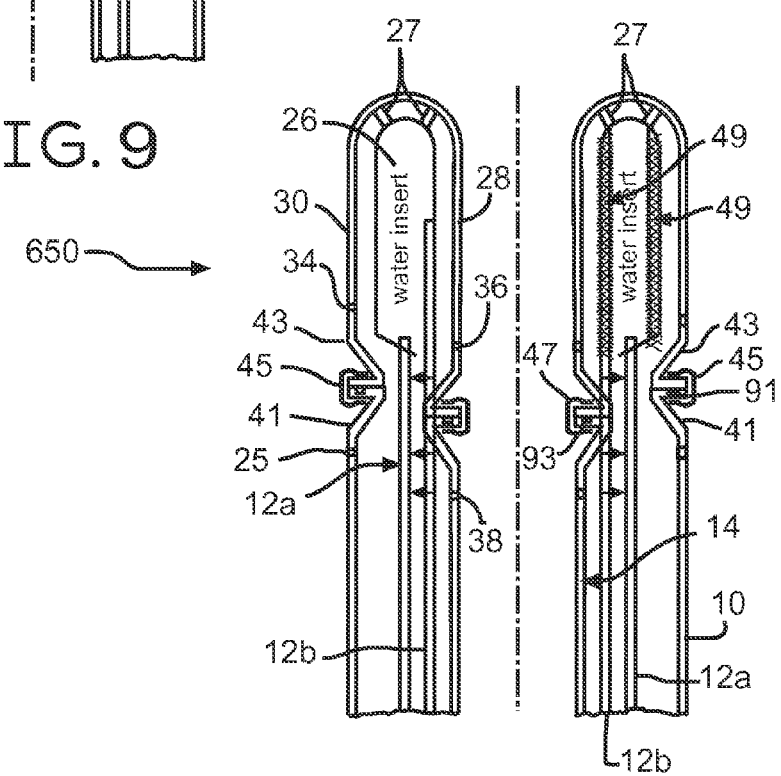

FIG. 10 illustrates schematically yet another embodiment 650 featuring lower and upper flange connectors 41, 43, which may be fastened together using one or more clips 45. O-rings, gaskets, or other seals 91, 93, with or without one or more grooves in flange faces, may be used if necessary. Lower flange connector 41 may be welded, soldered, or brazed to conduit 10 at 25, and to conduit 14 at 38. Upper flange connector 43 may be welded, soldered, or brazed to burner tip outer wall 30 at weld or braze area 34, and to burner tip inner wall 28 at weld or braze area 36. As with embodiment 630, embodiment 650 may be disfavored due to the need to reposition conduit 12 as illustrated by arrows (12a indicates possible new position, and 12b original position), and possible need to remove portions of insert 26, as indicated at 49, so that insert 26 will fit between flanged areas during assembly and disassembly.

Figure 11:
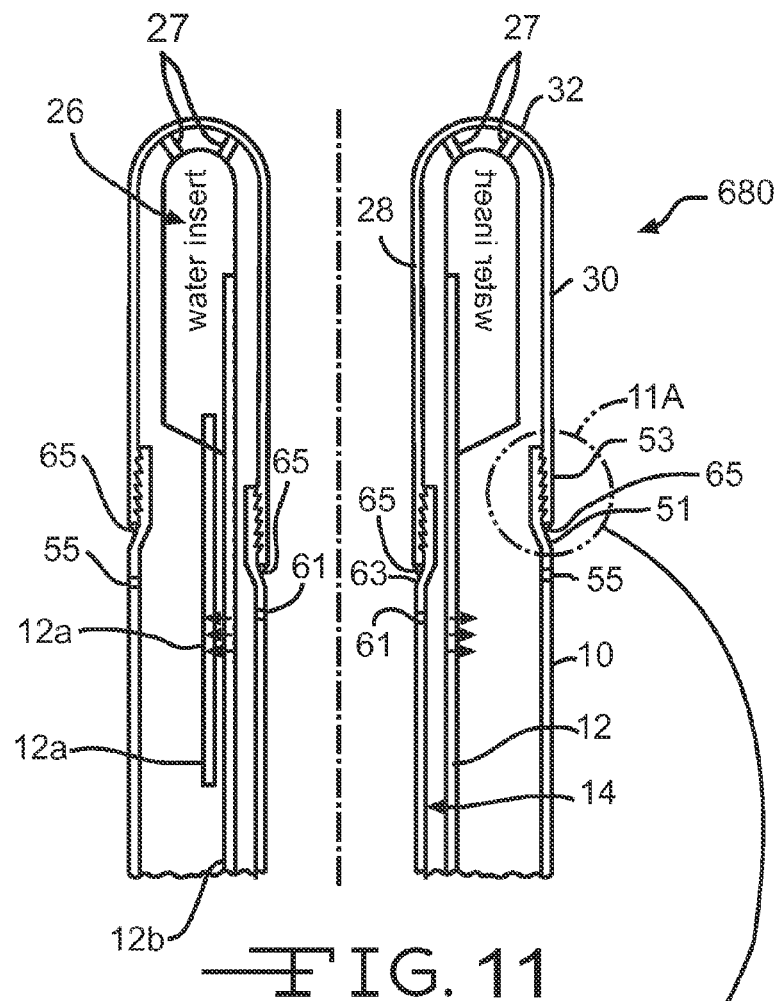
Figure 11A:
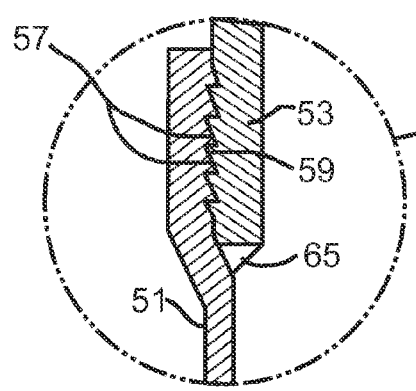

FIG. 11 illustrates schematically yet another embodiment 680 featuring locking dog or other type of shaped connectors 57, 59 (such as ribs, knurls, scallops, and the like) used to connect a lower area 53 of burner tip outer wall 30 to a shaped "grip ring" 51, as perhaps more evident in the detail of FIG. 11A. This type of connection, or a different type, may be used to connect a lower area of burner tip inner wall 28 to another shaped grip ring 63. Shaped grip ring 51 may be welded, soldered, or brazed to conduit 10 at area 55, and shaped grip ring 63 may be welded, soldered, or brazed to conduit 14 at area 61. To effect coolant seals, areas 65 may be welded, soldered, or brazed using appropriate materials for the service and conduit materials. As with examples 630, 650, embodiment 680 may require a slight repositioning of conduit 12 as illustrated by arrows (12a indicates possible new position, and 12b original position), however there should be less need to remove portions of insert 26 so that insert 26 will fit between flanged areas during assembly and disassembly, as insert 26 and conduit 12 need only clear grip rings 51, 63. Burner tip walls 28, 30, and crown 32 may comprise noble metal. Grip rings 51, 63 may each comprise a base metal with noble metal rolled thereon to form shaped connectors 57.

Those of skill in the art will appreciate that examples within the present disclosure may include a combination of the joining methods described herein, for example, in embodiment 300 illustrated schematically in FIG. 5, braze material 72 may be replaced with deformable features forming a seal, as described in relation to embodiment 100 illustrated schematically in FIGS. 2-3. Another embodiment may include, for example, interference fittings 92, 94 between second internal conduit 14 and inner wall 28 as illustrated schematically in FIG. 8, and brazed joints 74, 80, as illustrated schematically in FIG. 6. Yet other examples may include flange joints formed by flange portions 50, 52 and interference fittings 90, 96. Other various combinations of the techniques of joining burner tips and burner bodies of dissimilar metals disclosed herein are deemed within the present disclosure.

Those of skill in the art will also appreciate that outside of the burners described herein the warmed heat transfer fluid would be cooled so that it may be reused. As may also be appreciated, burner examples described herein define a mixing region 150 (FIG. 8) where fuel "F" and oxidant "O" mix, the mixing region 150 being partially formed by the through passage through burner tip, defined by burner tip inner wall 28. In certain examples, fuel emanates from the distal end of central conduit 15 (FIG. 1), and oxidant traverses through a third annulus 19 between central conduit 15 and second internal conduit 14, however, as mentioned herein, these flows could be changed so that fuel traverses third annulus 19 and oxidant traverses through central conduit 15.

The thickness of crown 32 and inner and outer walls 28, 30 in the various examples illustrated herein is not critical, and need not be the same for every region of the crown and walls. Suitable thicknesses may range from about 0.1 cm to about 1 cm, or larger. It is theorized there may be a balance between corrosion and fatigue resistance, and thickness, with the thickness requirement generally being increased if the "cortigue" resistance of the crown and/or wall material is reduced. Thicker crowns and walls, or thicker regions of crowns and walls, will generally be stronger and exhibit more fatigue resistance, but may be more difficult to install, for example if deformable interference fittings are to be employed.

Regardless of the types of structure used to join the burner tip to the burner body, several examples of which are described above, it has been discovered that the burners or portions thereof may be subjected to one or more post-manufacturing processes that may reduce fatigue points on those structures or otherwise improve the microstructure thereof. These post-manufacturing processes may be performed before or after the portions of the burner are joined. In that case, the processes may be performed on either or both of the burner tip or the burner body, either before or after these two elements are joined at flanges, welds, or other structures.

FIGS. 12A and 12B are a view and an enlarged view of a burner surface 200 and are described simultaneously. FIG. 12A, depicts a burner surface at approximately 20× magnification, while FIG. 12B depicts a burner surface at 200× magnification, to further illustrate the characteristics described herein. Common fatigue points are evident in FIGS. 12A and 12B, where machining lines and post-machining surface scratches may become mechanical or thermal fatigue crack initiation sites during service life of the burner. A plurality of machining lines 202 are depicted, substantially parallel to the machining line arrow 204. Additionally, a plurality of surface scratches 206 are depicted substantially parallel to surface scratch line arrow 208. Both machining lines 202 and surface scratches 206 may propagate into fatigue cracks. For example, fatigue crack 210 is depicted emanating from machining line 202a, while fatigue crack 212 is depicted emanating from surface scratch 206a. Although the measurements may vary from burner to burner, surface scratches and common machined component surface finish features are typically about 10 to about 100 microns in depth, and vary depending on machining technology and machine settings. Within the burner, stress exists not only through the material thickness, but also at the burner's surface. A rough surface condition results in stress risers at any discontinuity, those stress risers result in decreased time to onset of fatigue cracks. Once such fatigue cracks 210, 212 are initiated, they deepen and lengthen due to the burner's volatile thermal conditions and resulting stress cycling.

It has been discovered, however, that polishing of the burner after manufacture may mitigate the onset of fatigue initiation. The polishing decreases the microscopic surface variation, and thus delays the onset of fatigue. The portions of the burner that may benefit from polishing to remove surface discontinuities include any areas of the burner that are exposed to the volatile thermal conditions in the SCM. As such, polishing of the toroidal burner tip may significantly improve performance. However, polishing of the burner body, especially the areas thereof disposed proximate the burner tip or the connection points to the burner tip, may also improve performance. In examples, a preferred surface finish is less than about 1.0 micron or less than about 0.5 micron. More specifically, the surface finish may be between about 1.0 to about 0.1 micron. The polishing may have a circumferential or multiple random orientations of the microscopic as-finished surface texture. However, any amount of finishing which reduces surface roughness from the as-machined or as-scratched condition is beneficial, whether circumferential or randomly oriented.

The polishing processes reduce the surface roughness of the burner (or a portion thereof) from a first, higher surface roughness, to a second, lower surface roughness. It may be advantageous to measure the first surface roughness across an entire area of the burner, or discrete portions thereof (either randomly or specifically). This enables a determination of an average first surface roughness. As the polishing process proceeds, the roughness of the same surface may be measured (again, across the entire area of the burner, or portions thereof). Re-measuring of the surface roughness may determine an average second surface roughness. If the average second surface roughness is still not desirable, polishing of the burner may continue until the desired surface roughness is achieved. The amount of polish may be measured based on surface roughness measurements, surface features measurements, other measurements, or combinations thereof. One or more polishing operations (separated by measuring operations to determine surface finish) may reduce the average surface roughness such that a post-polishing surface roughness is about 5% of the pre-polishing surface roughness. In other examples, polishing operations may reduce the average surface roughness such that a post-polishing surface roughness is about 1% of the pre-polishing surface roughness. A post-polishing surface roughness about 0.1% of the pre-polishing surface roughness may also be desirable.

Figure 13:
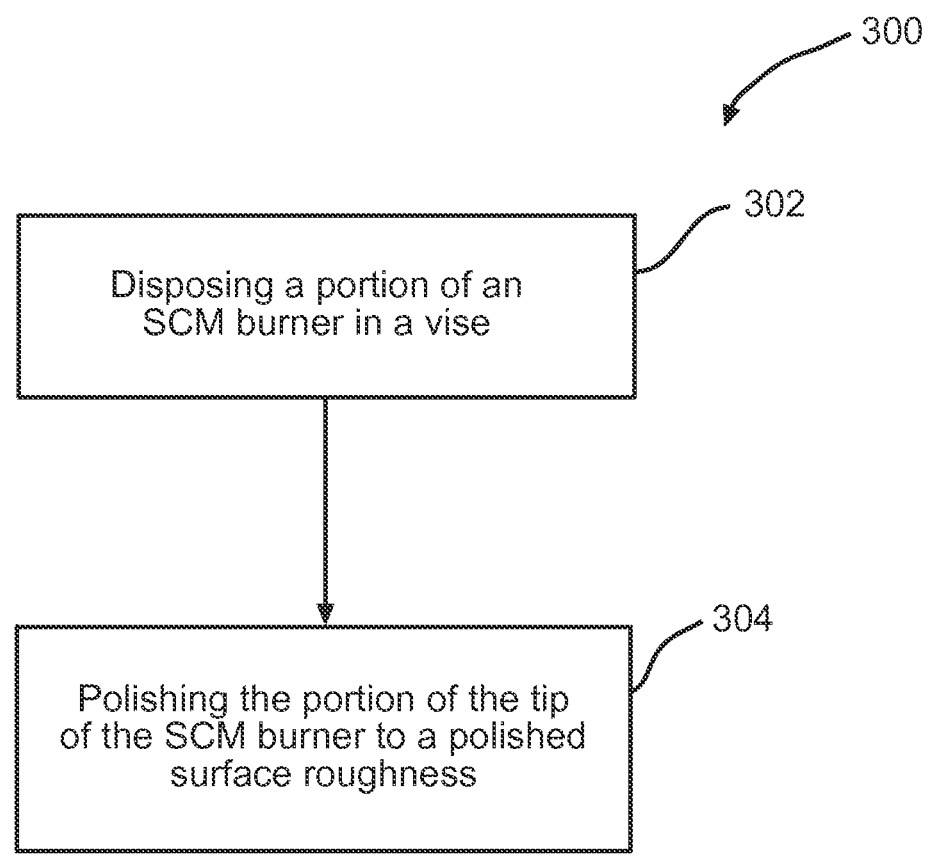
FIG. 13 depicts a method of polishing a portion of a burner after manufacture.

FIG. 13 depicts a method 300 of polishing a portion of a burner after manufacture. The method 300 begins with disposing a portion of an SCM burner in a vise in operation 302. Securing in a vise specifically is not required. Instead, the portion to be polished must be generally fixed in position such that it resists movement during polishing processes. In examples, the portion of the burner secured is the toroidal tip, although other portions of the burner, e.g., the burner body, could be secured for polishing purposes. Before polishing begins, the portion of the burner may be characterized as having an average first surface roughness across an area of the burner. The area may be the entire exposed surface of the portion of the burner to be polished. In other examples, the area may be a defined area contained within a boundary that may be measured before and after polishing to quantify results of polishing. In operation 304, the portion of the burner is polished to an average second surface roughness across the area of the portion of the burner. Of course, the average second surface roughness is less than the average first surface roughness. Example heights of surface features before and after polishing are described above. When comparing the two surface roughnesses, the differences may be significant as described above. It is often advantageous to perform operation 304 in a random pattern about the surface to be polished. Circumferential polishing is also contemplated.

Figure 14A:
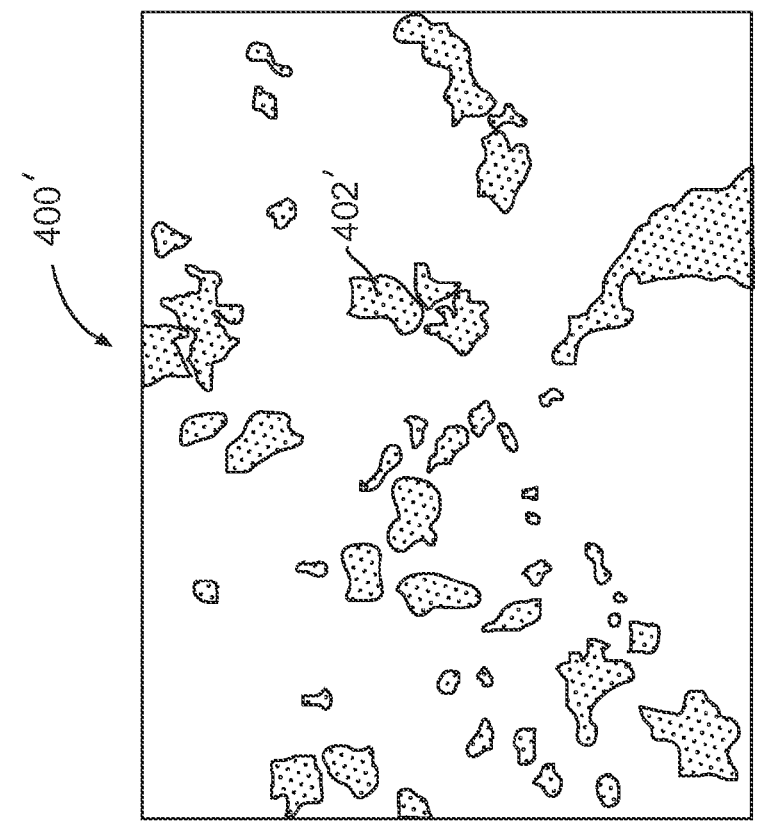
FIGS. 14A and 14B depict microstructures of a cast precious metal samples before and after hot isostatic pressing processes, respectively.
Figure 14B:
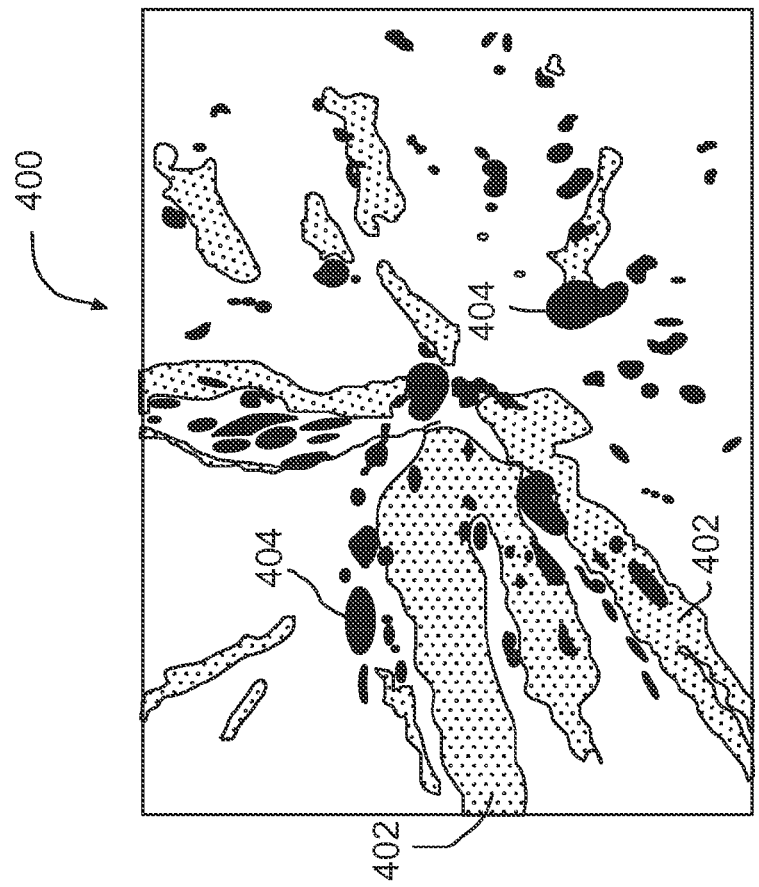

FIGS. 14A and 14B depict microstructures of cast precious metal samples 400, 400' before and after hot isostatic pressing processes, respectively. Post-processing of a burner or a part thereof (e.g., a burner body or a burner tip), as part of the manufacturing process improves the microstructure of the processed part by minimizing morphological differences through the part and eliminating defects of the exposed part, providing operational service life or mechanical property advantage. Post-manufacturing processing (as used herein "post-processing") includes heat treatments, hot-isostatic pressing (HIP), and similar timed temperature and/or pressure treatments. These processes, described in the context of FIGS. 14A, 14B, and 15, may be performed before or after the polishing processes described above. Alternatively, the polishing processes need not be performed at all for a part of a burner to benefit from the heat treatment process described herein.

By subjecting the burner part to post-processing, part life is extended by manipulating the size, aspect ratio, range, and/or orientation of the grains, as well as by eliminating voids, chemical micro-segregation, and other defects within the microstructure of the processed part. This helps the part withstand the volatile thermal environment and fatigue failures which may onset therein. In an un-processed part, defects and grains which are columnar (especially when columnar grains are aligned perpendicular to stress) enable rapid crack initiation and propagation while experiencing thermal and/or mechanical loads during service. Therefore, service life and mechanical properties such as ductility and strength are improved (and therefore are more accurately tailored) to the specific condition of the part during service. Another advantage is that post-processing of the part does not significantly change its geometry, therefore little or no additional machining is required to meet dimensional specifications.

In welded areas, morphological differences between the weld metal and the base metal provides higher probability for failure at the fusion line or heat affected zone, therefore post-processing any parts of the burner that have been welded minimizes or eliminates these differences, which greatly reduces the chances for failure, and improves the integrity of that part, therefore extending service life. The post-processing technologies described herein may be applied to metallic materials such as superalloy, precious, and other non-precious metal systems. The technology may be further applied to most any forming technologies including cast, wrought, forged, pressed, rolled, direct metal laser sintered, or other methods which generate less-than-desired morphology or non-uniformity within the burner. This also applies to both the raw part and within the burner around any repaired, welded, jointed, or otherwise discontinuous morphology as a result of the means used to manufacture the burner. In the context of SCM burners, the technology is particularly desirable since those burners are typically formed from cast precious metal parts. Cast precious metal display superior ductility and other properties that provide relatively high thermal shock resistance. Such precious metals also display risk of inferior attributes due to the localized non-uniformities (such as casting gates) required to form a cast burner.

Other advantages of post-processing are that the burner may be cast, weld-repaired, welded, or otherwise formed in ways that result in undesirable non-uniform or unintended voids or defects in the microstructure. Such burners, and especially the areas of the burner that have been welded, may be post-processed to eliminate such defects and still provide advantageous microstructure for improved part performance. Types of post-processing include heat treatments that approach a melting temperature of the metal, or at least at a combination of sufficient temperatures and times to promote nucleation, recrystallization, and grain growth-in. By utilizing these treatments, the microstructure is managed to a preferred condition. In an example, the post processing is hot isostatic pressing (HIP) that provides both the desired microstructure and also causes any defects or voids in the microstructure to be closed while grains recrystallize. This, in essence, mends any defects, including those caused by welding. Any such mended defects are one less potential failure site of the component during its life in the volatile thermal and mechanical loading environment of an SCM system.

FIG. 14A depicts a microstructure of a metal sample 400, prior to any post-processing. In this as-cast condition, the sample 400 displays unfavorable elongated grains 402 protruding inwards from the exterior surface, and also exhibits a high concentration of voids 404. In FIG. 14B, a post-processed sample 400' is depicted. The sample 400' has been subjected to HIP, which results in the grains 402' being no longer elongated inwards from the outer surface. Virtually all voids have been eliminated.

Table 2 depicts a range of HIP parameters, as well as parameters that produced particularly desirable results (identified as Example 1). In Example 1, a burner formed by a precious metal having a combination of about 80% Pt and about 20% Rh was utilized and subjected to HIP processing. Burners manufactured from combinations of Pt and Rh are particularly desirable because such combinations maintain a single phase regardless of temperature. This single phase performance may apply to any percentage combination of Pt and Rh (e.g., 0%-100% Pt through 100%-0% Rh). For example, burners manufactured from about 70% Pt and about 30% Rh, as well as burners manufactured from about 90% Pt and about 10% Rh, are expected to perform similarly. Other precious metals having different percentages of Pt and Rh are contemplated for burners.

TABLE 2

HIP parameters for burner post-processing

| Parameter | Range | Example 1 |
| --- | --- | --- |
| Temperature | 2200 to 3000° F. | 2600° F. |
| Time | 100 to 1000 minutes | 365 minutes |
| Pressure | 20,000 to 50,000 psi | 30,000 psi |

It has also been discovered that multiple post-processing cycles (e.g., HIP cycles) may be performed on a burner to achieve more desirable results. Table 3, below, depicts example pressures, temperature, and times for HIP processing of test parts that have been subjected to both laser welding and gar tungsten arc welding (GTAW), for multiple HIP cycles. Laser welding and GTAW produce different defects to the microstructure adjacent the weld. For example, laser welding causes a significant number of voids directly adjacent a very fine weld area, whereas GTAW creates a significant number of elongated grains over a fairly large area, with a large number of voids disposed just outside the area of grains. Removing these defects through HIP processing helps increase the life of the part. Prior to each HIP cycle, nondestructive defect detection techniques (such as dye penetrant inspection and radiography) may be performed to identify any defects for potential weld repair. This multi-step process brings additional mending to defects in the microstructure. Care should be taken so as not to cause overly large grains (and direct paths through grain boundaries) for cracks to propagate.

TABLE 3

Example HIP parameters

| No. | Sample | Thickness [in] | Pressure [psi] | T [° F.] | t [min] |
| --- | --- | --- | --- | --- | --- |
| 1 | As Cast | 0.06 | n/a | n/a | n/a |
| 2 | As Cast | 0.09 | n/a | n/a | n/a |
| 3 | HIP-1 2417 | 0.06 | 30,000 +/− 250 | 2417 +/− 25 | 365 +/− 15 |
| 4 | HIP-1 2417 | 0.09 | 30,000 +/− 250 | 2417 +/− 25 | 365 +/− 15 |
| 5 | HIP-1 2600 | 0.06 | 29,750 +/− 250 | 2600 +/− 25 | 365 +/− 15 |
| 6 | HIP-1 2600 | 0.09 | 29,750 +/− 250 | 2600 +/− 25 | 365 +/− 15 |
| 7 | HIP-2 2417 | 0.06 | 30,000 +/− 250 | 2417 +/− 25 | 365 +/− 15 |
| 8 | HIP-2 2417 | 0.09 | 30,000 +/− 250 | 2417 +/− 25 | 365 +/− 15 |
| 9 | HIP-2 2600 | 0.06 | 29,750 +/− 250 | 2600 +/− 25 | 365 +/− 15 |
| 10 | HIP-2 2600 | 0.09 | 29,750 +/− 250 | 2600 +/− 25 | 365 +/− 15 |

In the above Table 3, Samples 1 and 2 were as-cast test pieces having two different thicknesses that were not subjected to any HIP processing. Samples 3-5 are test parts having thicknesses as indicated and subjected to HIP processing with under the parameters indicated. All of Samples 3-5 were welded with both laser and GTAW welds. After one cycle of HIP processing, testing was performed to observe the remaining defects in the part. Proximate the laser weld, a significant number of the voids had been removed from the part and some voids had combined into single, rounder voids. This indicated that further processing would likely completely remove these rounder voids from the material. Proximate the GTAW welds, elongated grains had become more equiaxed and regular in shape, and very few voids were present. After subjecting the samples to a second cycle of HIP processing (Samples 7-10), nearly all voids were removed from the samples proximate the laser welds, while the grains proximate the GTAW weld were further equiaxed and the voids eliminated.

Figure 15:
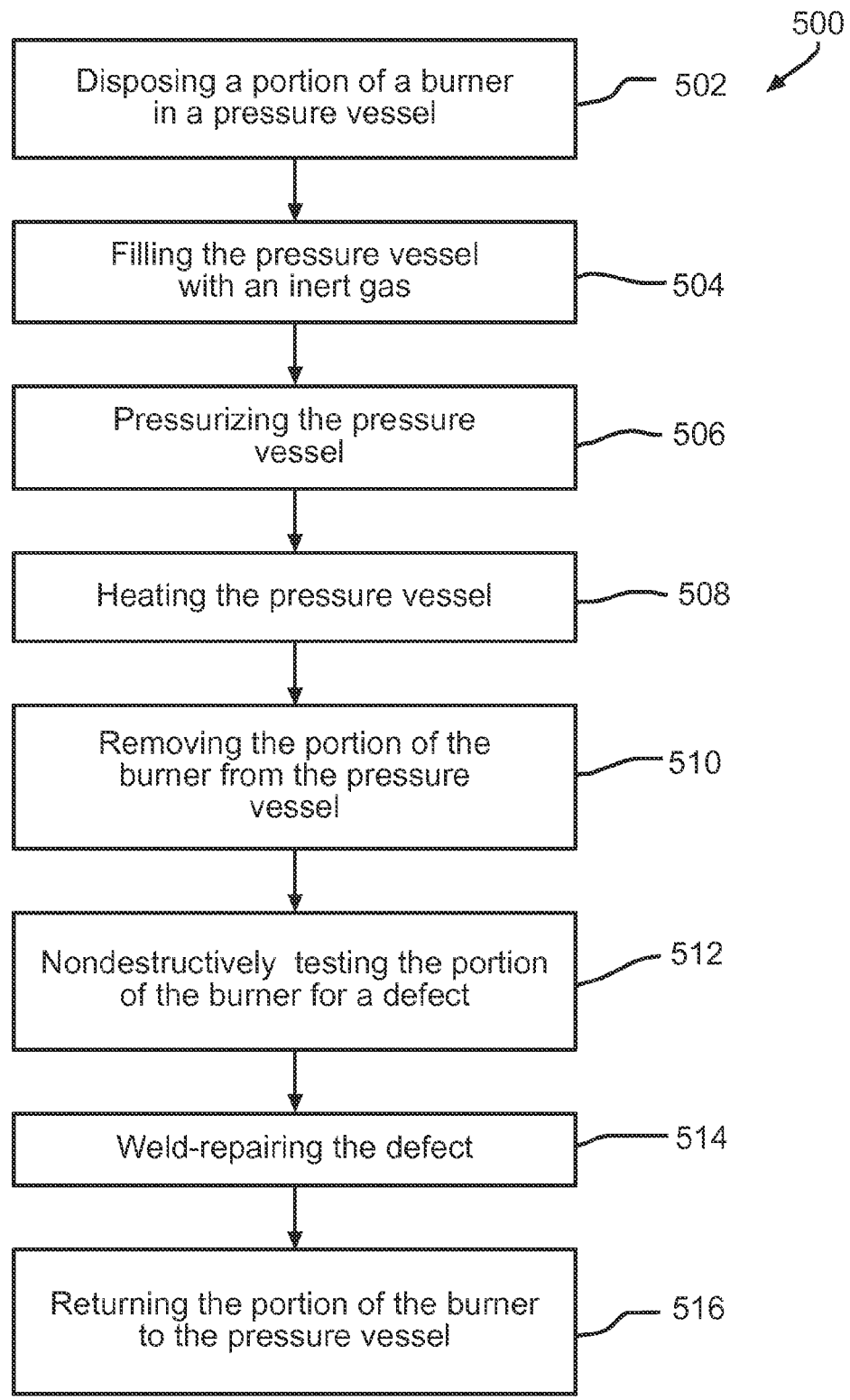
FIG. 15 depicts a method of hot isostatic processing a portion of a burner after manufacture.

FIG. 15 depicts a method 500 of hot isostatic processing a part after manufacture. The method 500 begins with operation 502, where a part is disposed within a pressure vessel. The burner part may be the burner body, the toroidal burner tip, or the burner itself (e.g., the combined burner tip and burner body). The part has a first microstructure defined by, among other characteristics, a first number of voids. The first microstructure may also be defined by elongated grains or other structures. Once the part is disposed in the pressure vessel, the vessel is sealed and filled with an isostatic gas such as argon or another inert gas, as in operation 504. In operation 506, the vessel is pressurized and in operation 508, the vessel is heated. These operations may occur substantially simultaneously. Example pressures may be between about 20,000 psi and about 50,000 psi; between about 25,000 psi and about 40,000 psi; and about 30,000 psi. Examples temperatures may be between about 2200 degrees F. to about 3000 degrees F.; between about 2450 degrees F. to about 2750 degrees F.; and about 2600 degrees F. The part may be held at the elevated temperature and pressure for a time sufficient to produce a second microstructure in the burner part. The second microstructure is defined by a second number of voids that is less than the first number of voids. As with the first microstructure, the second microstructure may also be characterized by elongated grains or other structures.

In testing performed on a burner part prior to HIP processing, it has been determined that the size and number of voids are significant. Testing has revealed that, prior to processing, voids can be as much as 500 microns in diameter. Void fraction in the first microstructure (again, prior to processing) can be as high as 20% or higher in welds. After HIP processing, void fraction can be reduced to significantly less than 1% (effectively 0%). Any remaining voids, however infrequent, may be much less than 5 microns in diameter. Regarding microstructure, the first microstructure can be dictated at least in part by the thickness and shape of the part in the region of interest, and the manufacturing methods to form the part. In the example above in FIG. 14A, the first microstructure reveals highly columnar grains before HIP. After HIP, the second microstructure is significantly more equiaxed and regular in shape. Specific analytical tools are known to quantify grain size, aspect ratio, size distribution, etc., and such tools would be known to a person of skill in the art. In general, the goal after HIP is to produce a microstructure that is more equiaxed and regular, with fewer voids, grains having more rounded edges, etc. As such, the microstructure is more normalized and is not simply heterogeneous with voids and defects. A more normalized microstructure displays advantages over a microstructure having elongated grains, which are unstable and have large driving force due their geometry to re-form at high temperatures. As such, elongated grains more easily form cracks, since the grain boundaries are highly aligned for cracks to propagate. Sufficient times to achieve the second microstructure may be between about 100 minutes to about 1000 minutes; between about 200 minutes to about 600 minutes; and about 365 minutes.

Once the appropriate amount of time has elapsed, the vessel is depressurized and cooled. Thereafter, in operation 510, the burner part is removed from the vessel. As described above, the part may be non-destructively tested so as to identify a burner defect, operation 512. In operation 514, defects may be weld-repaired. In operation 516, if desired, the part of the burner may be returned to the vessel and operations 502-508 repeated.

Figure 16:
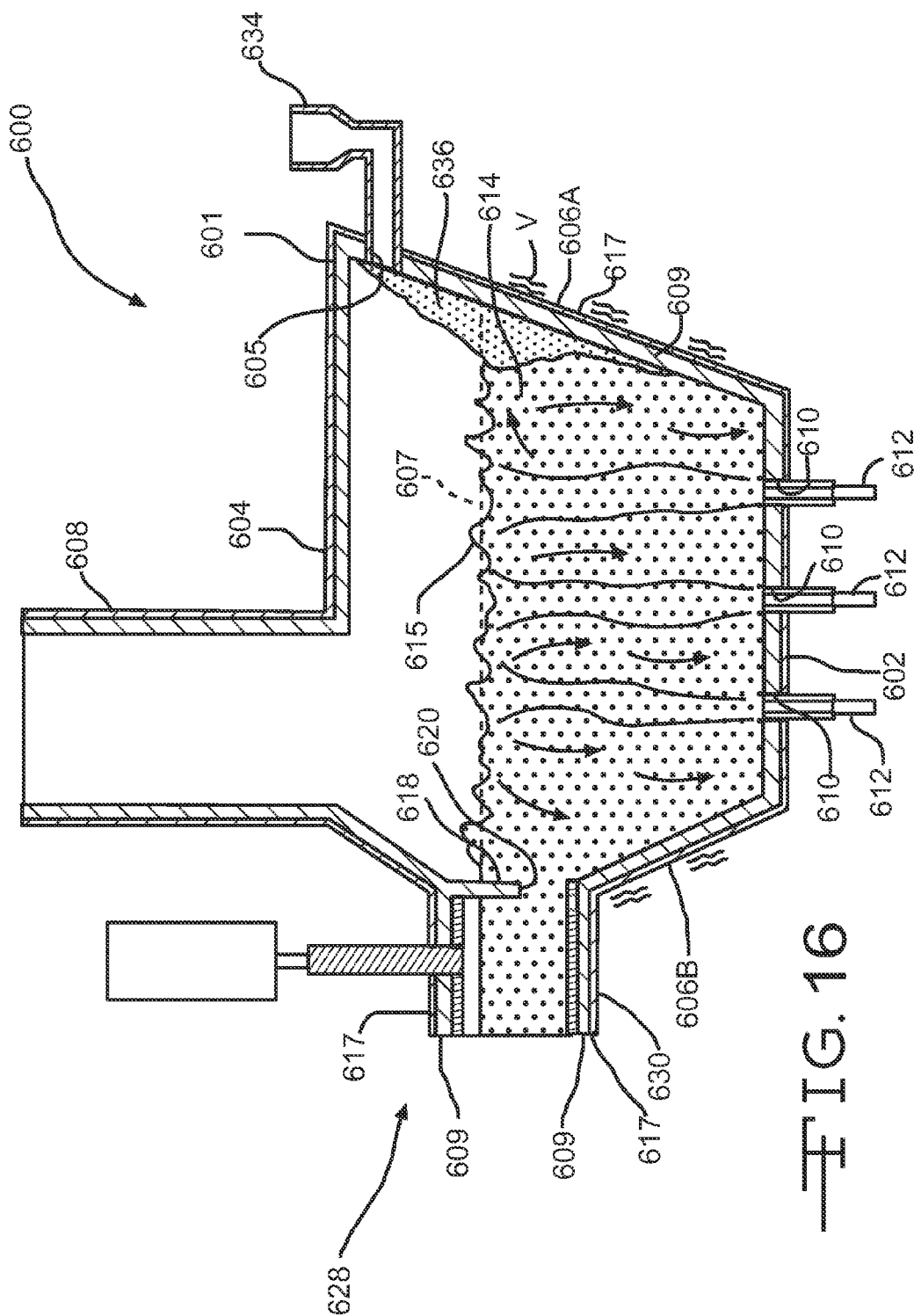
FIG. 16 depicts a schematic sectional view of a submerged combustion melter system.

FIG. 16 depicts a side sectional view of a melter system 600 that may be utilized in conjunction with the examples of the burners described above. The melter system 600 is a submerged combustion melter (SCM) and is described in more detail in U.S. Patent Application Publication No. 2013/0283861, the disclosure of which is hereby incorporated by reference herein in its entirety. Melter apparatus or melt vessel 601 of FIG. 6 includes a floor 602, a roof or ceiling 604, a feed end wall 606A, a first portion of an exit end wall 606B, and a second portion of the exit end wall 606C. Each of the floor 602, the roof 604, and walls 606A, 606B, and 606C comprise a metal shell 617 and a refractory panel 609, some or all of which may be fluid-cooled. Exit end wall portion 606C may form an angle with respect to a skimmer 618.

The melt vessel 601 may be fluid cooled by using a gaseous, liquid, or combination thereof, heat transfer media. In certain examples, the wall may have a refractory liner at least between the panels and the molten glass. Certain systems may cool various components by directing a heat transfer fluid through those components. In certain examples, the refractory cooled-panels of the walls, the fluid-cooled skimmer, the fluid-cooled dam, the walls of the fluid-cooled transition channel, and the burners may be cooled by a heat transfer fluid selected from the group consisting of gaseous, liquid, or combinations of gaseous and liquid compositions that function or are capable of being modified to function as a heat transfer fluid. Different cooling fluids may be used in the various components (e.g., wall portions of the melt vessel 601, the burners 612, etc.), or separate portions of the same cooling composition may be employed in all components. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids, which may be organic, inorganic, or some combination thereof, for example, salt solutions, glycol solutions, oils and the like. Other possible heat transfer fluids include water, steam (if cooler than the oxygen manifold temperature), carbon dioxide, or mixtures thereof with nitrogen. Heat transfer fluids may be compositions including both gas and liquid phases, such as the higher chlorofluorocarbons.

The melt vessel 601 further includes an exhaust stack 608, and openings 610 for submerged combustion burners 612, which create during operation a highly turbulent melt matrix indicated at 614. Examples of SCM burners 612 are described above. Highly turbulent melt matrix 614 may have an uneven top surface 615 due to the nature of submerged combustion. An average level 607 is illustrated with a dashed line. In certain examples, burners 612 are positioned to emit combustion products into molten matrix in the melting zone 614 in a fashion so that the gases penetrate the melt generally perpendicularly to floor 602. In other examples, one or more burners 612 may emit combustion products into the melt at an angle to floor 602.

In an SCM, combustion gases emanate from burners 612 under the level of a molten matrix. The burners 612 may be floor-mounted, wall-mounted, or in melter examples comprising more than one submerged combustion burner, any combination thereof (for example, two floor mounted burners and one wall mounted burner). These combustion gases may be substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

At least some of the burners may be mounted below the melt vessel, and in certain examples the burners may be positioned in one or more parallel rows substantially perpendicular to a longitudinal axis of the melt vessel. In certain examples, the number of burners in each row may be proportional to width of the vessel. In certain examples the depth of the vessel may decrease as width of the vessel decreases. In certain other examples, an intermediate location may comprise a constant width zone positioned between an expanding zone and a narrowing zone of the vessel, in accordance with U.S. Patent Application Publication No. 2011/0308280, the disclosure of which is hereby incorporated by reference herein in its entirety.

Returning to FIG. 6, the initial raw material may be introduced into melt vessel 601 on a batch, semi-continuous or continuous basis. In some examples, a port 605 is arranged at end 606A of melt vessel 601 through which the initial raw material is introduced by a feeder 634. In some examples, a batch blanket 636 may form along wall 606A, as illustrated. Feed port 605 may be positioned above the average matrix melt level, indicated by dashed line 607. The amount of the initial raw material introduced into melt vessel 601 is generally a function of, for example, the capacity and operating conditions of melt vessel 601 as well as the rate at which the molten material is removed from melt vessel 601.

The initial raw material may include any material suitable for forming a molten matrix, such as glass and/or inorganic non-metallic feedstocks such as rock (basalt) and mineral wool (stone wool). With regard to glass matrices, specifically, limestone, glass, sand, soda ash, feldspar and mixtures thereof may be utilized. In one example, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in U.S. Published Patent Application No. 2008/0276652, the disclosure of which is hereby incorporated by reference herein in its entirety. The initial raw material may be provided in any form such as, for example, relatively small particles.

As noted herein, submerged combustion burners may produce violent turbulence of the molten matrix and may result in a high degree of mechanical energy (e.g., vibration V in FIG. 6) in the submerged combustion melter that, without modification, is undesirably transferred to the conditioning channel. Vibration may be due to one or more impacts from sloshing of the molten matrix, pulsing of the submerged combustion burners, popping of large bubbles above submerged burners, ejection of the molten matrix from main matrix melt against the walls and ceiling of melt vessel 601, and the like. Melter exit structure 628 comprises a fluid-cooled transition channel 30, having generally rectangular cross-section in melt vessel 601, although any other cross-section would suffice, such as hexagonal, trapezoidal, oval, circular, and the like. Regardless of cross-sectional shape, fluid-cooled transition channel 630 is configured to form a frozen matrix layer or highly viscous matrix layer, or combination thereof, on inner surfaces of fluid-cooled transition channel 630 and thus protect melter exit structure 628 from the mechanical energy imparted from the melt vessel 601 to melter exit structure 628. This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method comprising:
    disposing at least a portion of a submerged combustion burner into a pressure vessel, wherein the portion of the submerged combustion burner has a first microstructure defined by a first number of voids;
    filling the pressure vessel containing the portion of the submerged combustion burner with an inert gas;
    pressurizing the pressure vessel containing the portion of the submerged combustion burner;
    heating the pressure vessel containing the portion of the submerged combustion burner, wherein the pressurizing and heating operations are performed for a time and at a temperature and a pressure sufficient to produce a second microstructure in the burner, wherein the second microstructure is defined by a second number of voids less than the first number of voids; and
    weld-repairing a defect in the portion of the submerged burner before disposing the portion of the submerged combustion burner in the pressure vessel.

2. The method of claim 1, wherein the portion of the submerged combustion burner comprises at least one of a burner body, a burner tip, and a burner base, and wherein the portion of the submerged combustion burner comprises a weld.

3. The method of claim 1, wherein the temperature is in a range from about 2200 degrees F. to about 3000 degrees F.

4. The method of claim 3, wherein the temperature is in a range from about 2450 degrees F. to about 2750 degrees F.

5. The method of claim 4, wherein the temperature is about 2600 degrees F.

6. The method of claim 1, wherein the time is in a range from about 100 minutes to about 1000 minutes.

7. The method of claim 6, wherein the time is in a range from about 200 minutes to about 600 minutes.

8. The method of claim 7, wherein in the time is about 365 minutes.

9. The method of claim 1, wherein the pressure is in a range of between about 20,000 psi and about 50,000 psi.

10. The method of claim 9, wherein the pressure is in a range of between about 25,000 psi and about 40,000 psi.

11. The method of claim 10, wherein the pressure is about 30,000 psi.

12. The method of claim 1, further comprising:
    removing the portion of the submerged burner from the pressure vessel;
    non-destructively testing the portion of the submerged burner for a defect;
    weld-repairing the defect; and
    returning the portion of the submerged combustion burner to the pressure vessel.

* * * * *